(12) United States Patent
Yan et al.

(10) Patent No.: US 11,206,237 B1
(45) Date of Patent: Dec. 21, 2021

(54) OMNICHANNEL COMMUNICATION SYSTEM

(71) Applicant: ManyChat, Inc., San Francisco, CA (US)

(72) Inventors: Mikael Yan, Palo Alto, CA (US); Anton Gorin, Moscow (RU); Dmitry Kushnikov, Moscow (RU)

(73) Assignee: ManyChat, Inc., San Francisco, CA (US)

(*) Notice: Subject to any disclaimer, the term of this patent is extended or adjusted under 35 U.S.C. 154(b) by 0 days.

(21) Appl. No.: 17/017,480

(22) Filed: Sep. 10, 2020

(51) Int. Cl.
| | |
|---|---|
| *G06F 15/16* | (2006.01) |
| *H04L 12/58* | (2006.01) |
| *G06Q 50/00* | (2012.01) |
| *G06Q 30/00* | (2012.01) |
| *G06F 16/2457* | (2019.01) |
| *G06Q 10/10* | (2012.01) |
| *G06N 20/00* | (2019.01) |

(52) U.S. Cl.
CPC ........ *H04L 51/36* (2013.01); *G06F 16/24578* (2019.01); *G06Q 10/107* (2013.01); *G06Q 30/016* (2013.01); *G06Q 50/01* (2013.01); *H04L 51/02* (2013.01); *G06N 20/00* (2019.01)

(58) Field of Classification Search
CPC ......... H04L 51/02; H04L 51/10; H04L 69/14; H04N 21/4383
USPC ................................................. 709/204, 206
See application file for complete search history.

(56) References Cited

U.S. PATENT DOCUMENTS

| | | | |
|---|---|---|---|
| 2014/0024350 A1* | 1/2014 | Bouzid | H04W 88/06 455/414.1 |
| 2018/0212964 A1* | 7/2018 | Bender | H04L 63/067 |
| 2021/0029064 A1* | 1/2021 | Higgins | G06Q 30/0203 |

\* cited by examiner

*Primary Examiner* — Wing F Chan
*Assistant Examiner* — Andrew Woo
(74) *Attorney, Agent, or Firm* — Van Pelt, Yi & James LLP

(57) ABSTRACT

A specification of a logic flow for automatically interacting with a message recipient is received. The logic flow specifies a dynamic interaction between a plurality of different communication channels for the message recipient. The logic flow is deployed including by automatically sending a first message to the message recipient via a first communication channel, receiving an indication provided in response to a plurality of response options provided in the first message, and in response to the indication, automatically sending a second message associated with the indication via a second communication channel that is different from the first communication channel.

19 Claims, 17 Drawing Sheets

| Broadcasts > History | | | | | |
|---|---|---|---|---|---|
| | Type | Name | Sent | Delivered (%) | Clicked (%) | Read (%) |
| ... | ▷ | Send Email | 199492 | 191508 (96.00%) | 349 (0.18%) | 15053 (7.86%) |
| ... | ◉ | Send Facebook Message | 128512 | 127619 (99.31%) | 21343 (16.72%) | 124036 (97.19%) |
| ... | ◎ | Send SMS | 288918 | 0 (0.00%) | 288918 (90%) | |

FIG. 8

OMNICHANNEL COMMUNICATION SYSTEM

BACKGROUND OF THE INVENTION

An enterprise selling products or services online may use one or more communication channels to communicate with prospective, current, and/or previous customers. For example, the enterprise may have a webpage, an online marketplace on a social media platform, send emails, send short message service (SMS) messages, use messaging applications, use social media platforms, etc. to communicate with prospective, current, and/or previous customers.

However, one problem that enterprises face in communicating with prospective, current, and/or previous customers across a plurality of communication channels is that such communications across the plurality of communications is not continuous, rather they are isolated and not connected. It may be difficult to keep track of information that is disclosed by a customer across the plurality of communication channels. The enterprise may broadcast messages to prospective, current, and/or previous customers. However, the communications between the enterprise and a prospective, current, and/or previous customer on a first communication channel do not necessarily influence communications between the enterprise and the prospective, current, and/or previous customer on a second communication channel. This may cause some prospective, current, and/or previous customers to become frustrated with the enterprise because information that was previously communicated in a previous communication channel may need to be re-communicated in a different communication channel.

BRIEF DESCRIPTION OF THE DRAWINGS

Various embodiments of the invention are disclosed in the following detailed description and the accompanying drawings.

FIG. 8 is an example of a unified message interface in accordance with some embodiments.

DETAILED DESCRIPTION

Figure 1:
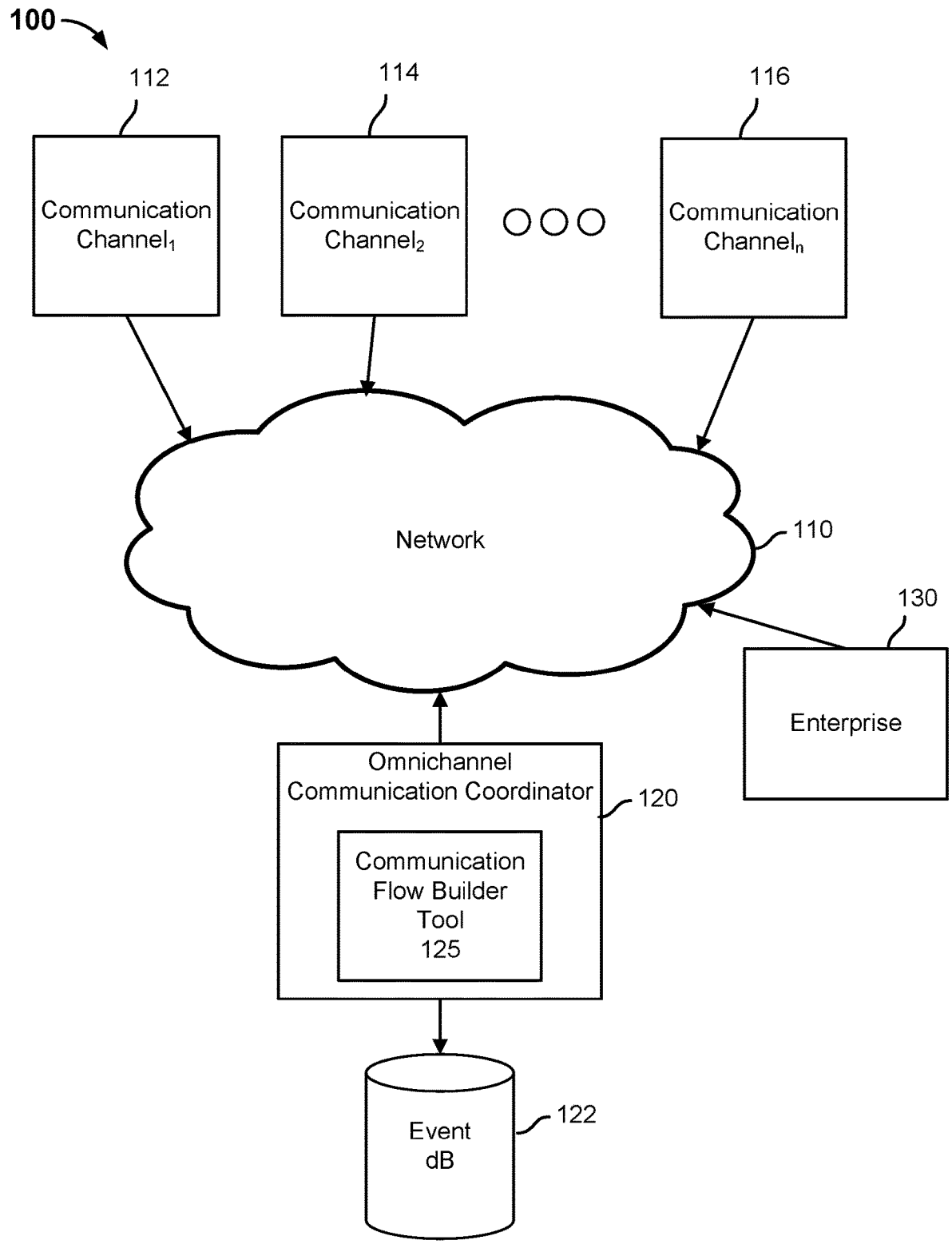
FIG. 1 is a block diagram illustrating an omnichannel communication system in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An enterprise selling products or services online may implement a chatbot on one or more communication channels to communicate with prospective, current, and/or previous customers. Chatbots provide an enterprise with the ability to communicate with prospective, current, and/or previous customers without maintaining a call center to address their concerns. However, each communication session that a prospective, current, and/or previous customer conducts with a chatbot, the chatbot is unaware of any previous communication sessions. This may cause prospective, current, and/or previous customers to become frustrated because they need to repeat information that was previously disclosed in a previous communication session.

An omnichannel communication system enabling automatic and dynamic conversations across a plurality of communication channels is disclosed herein. An enterprise may communicate with potential, current, and/or previous customers using a plurality of communication channels. Examples of communication channels include e-mail, short messaging service (SMS), multimedia messaging service (MMS), social media platforms (e.g., Facebook™ LinkedIn™, Instagram™, Snapchat™, Twitter™, TikTok™, etc.), messaging platforms (e.g., Whatsapp™, Facebook™ Messenger, Telegram, etc.), websites, website chat, etc. The enterprise may use one or more communication channels to generate new leads, convert leads to customers, and/or re-engage existing customers for repeat business.

The omnichannel communication system may provide a communication flow builder that enables a user associated with an enterprise to generate a specification of a logic flow for automatically and dynamically interacting with a recipient of one or more messages. The logic flow may enable an enterprise to have continuous conversation with a customer across a plurality of communication channels instead of discrete and isolated conversations across the plurality of communication channels. The logic flow may specify the manner in which to generate new leads, the manner in which to convert leads to customers, and/or the manner in which to re-engage existing customers for repeat business. The communication flow builder is a flexible tool that enables enterprises to generate logic flows specific for their type of customers, industry, marketing budget, etc.

For example, an enterprise may send an SMS message to the device associated with a customer. The SMS may include a link that leads to a website that is built using the omnichannel communication system. The flow between the SMS message and the website may be specified using the communication flow builder.

In another example, an enterprise may place a chat widget on its website that enables the enterprise to communicate with customers. This enables the enterprise to redirect customers to the website through communication channels, such as email or SMS. The flow between the communication channels and the website chat widget may be specified using the communication flow builder. A unified customer profile may be used to start the right automation through the website chat interface.

In another example, an enterprise may have a page on a social media platform. The social media platform may provide a chatbot to engage potential customers on behalf of the enterprise. A block of the logic flow may specify that during the first communication session the chatbot is to request follow-up communication information associated with a potential customer, such as an e-mail address or a mobile phone number. The logic flow may specify that in the event the potential customer has provided an e-mail address, the block of the logic flow may be connected to a different block that indicates a follow-up email is to be sent to the potential customer. The different block may indicate when the follow-up email is to be sent, the content of the follow-up email, and any other additional information to be included in the follow-up email. The logic flow may specify that in the event the potential customer has provided a mobile phone number, the block of the logic flow may be connected to a different block that indicates an SMS message is to be sent to the potential customer. The different block may indicate when the SMS message is to be sent, the content of the SMS message, and any other additional information to be included in the SMS message. A path of the logic flow used by the omnichannel communication system may depend on the contact information provided by a potential recipient.

A block of the logic flow may indicate that the enterprise is to send a first message via a first communication channel (e.g., an email) to a device associated with a message recipient in the manner specified by the block. The first message may include a plurality of response options. Each of the plurality of response options may embed a corresponding ref uniform resource link (URL). Each of the corresponding ref URLs may be associated with a corresponding reference value (e.g., unique code). An example of a unique code is a hash. A ref URL and associated reference value may be provided to the second communication channel in response to the selection of the selected response option by the message recipient.

In response to a selection of one of the response options, a block of the logic flow may indicate that the message recipient is to automatically receive a second message via a second communication channel (e.g., the social media platform). The second communication may send the second message to the device associated with the message recipient via a chatbot associated with the second communication channel. Other chatbots may be unaware of any previous communication sessions, such as the first communication session, between the potential customer and the enterprise. Other chatbots may send a generic introduction message, such as "Welcome, how can I help you today?" even though the message recipient and the enterprise have previously communicated. A chatbot associated with the second communication channel may send to the omnichannel communication system a message that includes the reference value that was included in the ref URL.

The omnichannel communication system may log all communications between a message recipient and all communication channels associated with an enterprise. In response to receiving the communication, the omnichannel communication system may determine a block of the logic flow associated with the enterprise based on the reference value associated with the conversation. The reference value associated with the conversation may indicate a resume communication block within the logic flow for the message recipient. For example, the reference value associated with the conversation may indicate the message recipient is associated with a block that provides a coupon code. After determining the block of the logic flow, the omnichannel communication system may provide to the second communication channel the message associated with the determined block. The chatbot associated with the second communication channel may provide the message associated with the determined block (e.g., "Here is your coupon code: 10OFFNOW") in a second communication session instead of providing the generic introduction message. This may increase the likelihood that the enterprise is able to convert the potential customer into an actual customer.

The omnichannel communication system provides an enterprise with the ability to conduct a continuous conversation with customers (potential, current, or previous) across a plurality of communication channels instead of having discrete and disconnected conversations with customers. This improves customer relations between the enterprise and the customers because a customer does not need to repeat to a customer service representative associated with the enterprise (e.g., a chatbot) information that was previously disclosed in a previous communication session.

FIG. 1 is a block diagram illustrating an omnichannel communication system in accordance with some embodiments. In the example shown, omnichannel communication system 100 includes omnichannel communication coordinator 120 that is connected, via network 110, to a first communication channel 112, a second communication channel 114, . . . , and an nth communication channel 116. For example, the first communication channel 112 may correspond to a social media platform, the second communication channel 114 may correspond to an email address, and the nth communication channel 116 may correspond to a mobile device.

Omnichannel communication coordinator 120 may be configured to communicate with customers over n different communication channels, but the number of communication channels that omnichannel communication coordinator 120 actually communicates with a customer depends on the communication channel contact information provided by a customer. For example, the customer may only have provided his social media account contact information and his email address, but not his mobile device number. Omnichannel communication coordinator 120 may be configured to communicate with the customer via a social media platform associated with the customer's social media account and via an email account associated with the customer, even though the customer has a mobile device.

Network 110 may be a wireless or wired network. Network 110 may correspond to the Internet, a local area network, a wide area network, a campus area network, a metropolitan area network, a personal area network, a storage area network, etc.

Omnichannel communication coordinator 120 includes one or more computing devices. Each of the one or more computing devices has a corresponding processor, a corresponding memory, and a corresponding storage device. Omnichannel communication coordinator 120 may be configured to communicate with different types of communication channels. Examples of communication channel types include social media platforms, email, SMS, MMS, messaging platforms, telephone, brick-and-mortar, etc. The types of communication channels associated with a first customer may be different than the types of communication channels associated with other customers. For example, a first customer may be associated with a social media platform and an email address and a second customer may be associated with the social media platform and a mobile device phone number, but not an email address.

Omnichannel communication coordinator 120 may provide a communication flow builder tool 125 that enables a user associated with enterprise 130 (e.g., an administrator) to specify a logic flow of communications between a customer and enterprise 130 across a plurality of communication channels, such as communication channels 112, 114, 116. A user associated with enterprise 130 may use the communication flow builder tool 125 to generate new leads, to convert leads into customers, and/or re-engage existing customers for repeat business.

Omnichannel communication coordinator 120 may receive from a user associated with enterprise 130 via communication flow builder tool 125 a logic flow, which includes a specification of blocks that describe how enterprise 130 is to communicate with one or more customers. For example, the logic flow may indicate that enterprise 130 is to initially communicate with a customer over a first communication channel 112, such as a social media platform, to obtain contact information for other communication channels that are associated with the customer. In the event the customer provides contact information for one or more other communication channels, such as communication channel 114 or communication channel 116, the logic flow may indicate how and when to communicate with the customer over the one or more other communication channels. For example, after obtaining a customer's email address, the logic flow may indicate that one day after obtaining the customer's email address, enterprise 130 is to send over communication channel 114 associated with the customer an email with a coupon offering a discount on goods or services associated with enterprise 130.

Omnichannel communication coordinator 120 is coupled to event database 122. A customer may be assigned a customer identifier. The customer identifier may be associated with an identifier associated with the customer's device (e.g., IP address, MAC address, etc.). Event database 122 may store a corresponding log for each customer per enterprise. In some embodiments, the log associated with a customer is configured to store communications (e.g. SMS, emails, chats, etc.) that were communicated with the customer. In some embodiments, the log associated with a customer is configured to store activity associated with the customer, such as viewing a website, pressing on a button, purchasing a product, opening an email, clicking on a link, etc.

For example, event database 122 may store a first log for a first customer communicating with a first enterprise and a second log for the first customer communicating with a second enterprise. The log may associate the customer identifier with a location in the logic flow specified by enterprise 130. This enables communications between enterprise 130 and the customer to resume at the location within the logic flow instead of at the beginning of the logic flow. Each of the blocks included in the logic flow may be associated with a corresponding block identifier. Each of the block identifiers associated with a logic flow is unique. A chatbot associated with a communication channel may provide to omnichannel communication coordinator 120 the unique block identifier. In response to receiving the unique block identifier, omnichannel communication coordinator 120 is configured to determine a resume communication block within the logic flow based on the unique block identifier. Omnichannel communication coordinator 120 may identify the block within the logic flow based on the unique block identifier and provide to the chatbot associated with a communication channel the message and any other additional information that is to be communicated to the customer via the communication channel.

A customer associated with enterprise 130 may have a first communication session with a chatbot associated with communication channel 112 via a device associated with the customer (e.g., computer, mobile device, tablet, desktop, laptop, smart watch, smart phone, etc.). At a later point in time, the customer associated with enterprise 130 may have a subsequent communication session with the chatbot associated with communication channel 112 via the device associated with the customer. In other systems, the chatbot associated with communication channel 112 is configured to treat the subsequent communication session as an initial communication session even though the customer associated with enterprise 130 has previously communicated with the chatbot. This may cause the customer associated with enterprise 130 to become frustrated because the customer needs to repeat information that was previously disclosed to the chatbot associated with communication channel 112 in a previous communication session.

The communication flow builder tool provided by omnichannel communication coordinator 120 enables the chatbot associated with communication channel 112 to determine a context of the relationship between the customer associated with enterprise 130 and enterprise 130. For example, a chatbot associated with communication channel 112 may determine whether a communication with a customer associated with enterprise 130 is a first communication or a subsequent communication.

The chatbot associated with communication channel 112 may determine that the communication with the customer associated with enterprise 130 is a first communication in part by sending to omnichannel communication coordinator 120, an identifier associated with the customer's device. Omnichannel communication coordinator 120 may determine whether a log associated with the identifier provided by the chatbot is stored in event database 122. A log associated with a customer may indicate a last known communication between the customer and enterprise 130. In the event event database 122 does not store a log for the identifier provided by the chatbot, omnichannel communication coordinator 120 may provide the chatbot associated with communication channel 112 an indication that a log associated with the provided identifier is not stored in event database 122. In response to receiving the indication, the chatbot associated with communication channel 112 may initiate communications with the customer associated with enterprise 130 based on the logic flow specified by enterprise 130.

The chatbot associated with communication channel 112 may determine that the communication with the customer associated with enterprise 130 is a subsequent communication in part by sending to omnichannel communication coordinator 120, an identifier associated with the customer's device. Omnichannel communication coordinator 120 may determine whether a log associated with the identifier provided by the chatbot is stored in event database 122. In the event event database 122 stores a log for the identifier provided by the chatbot, omnichannel communication coordinator 120 may determine a resume communication block within the logic flow specified by enterprise 130. In response to determining the resume communication block, omnichannel communication coordinator 120 may provide to the chatbot associated with communication channel 112 the message associated with the resume communication block. In response to receiving the message associated with the resume communication block, the chatbot associated with communication channel 112 may resume communications with the customer associated with enterprise 130 based on the logic flow specified by enterprise 130.

In some embodiments, the chatbot associated with communication channel 112 receives a reference URL that includes a reference value associated with the conversation (e.g., unique code) from a different communication channel, such as communication channel 114, 116. In response to receiving the reference URL, the chatbot associated with communication channel 112 may provide to omnichannel communication coordinator 120 the reference value associated with the conversation included in the reference URL. In response to receiving the reference value associated with the conversation, omnichannel communication coordinator 120 may determine a resume communication block based on the reference value associated with the conversation. In response to determining the resume communication block, omnichannel communication coordinator 120 may provide to the chatbot associated with communication channel 112 the message associated with the resume communication block. In response to receiving the message associated with the resume communication block, the chatbot associated with communication channel 112 may resume communications with the customer associated with enterprise 130 based on the logic flow specified by enterprise 130.

In some embodiments, a chatbot associated with communication channel 114 or 116 is able to determine a context of the relationship between the customer associated with enterprise 130 and enterprise 130 based on one or more communication sessions between the customer associated with enterprise 130 and a chatbot associated with communication channel 112.

Figure 2:
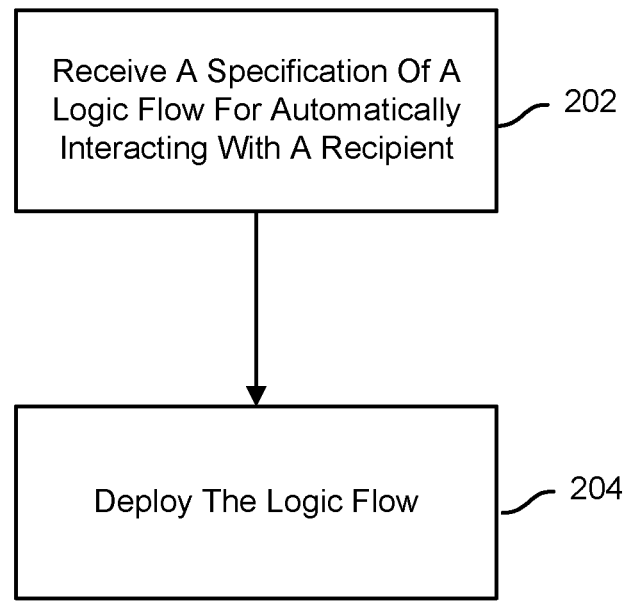
FIG. 2 is a flow diagram illustrating a process of communicating over a plurality of communication channels in accordance with some embodiments.
Figure 3A:
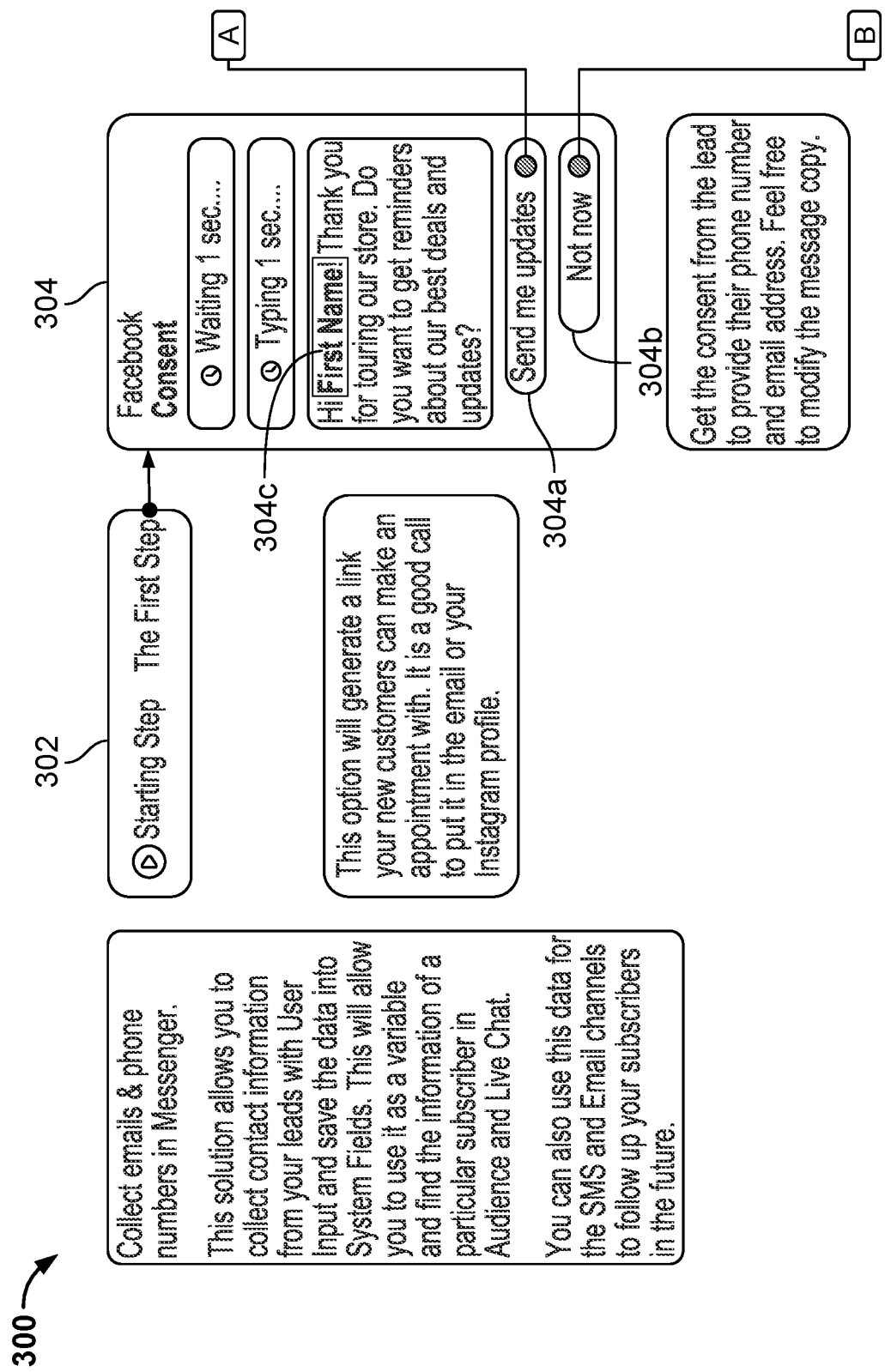
FIGS. 3A-3J is an example of a specification of a logic flow in accordance with some embodiments.
Figure 3B:
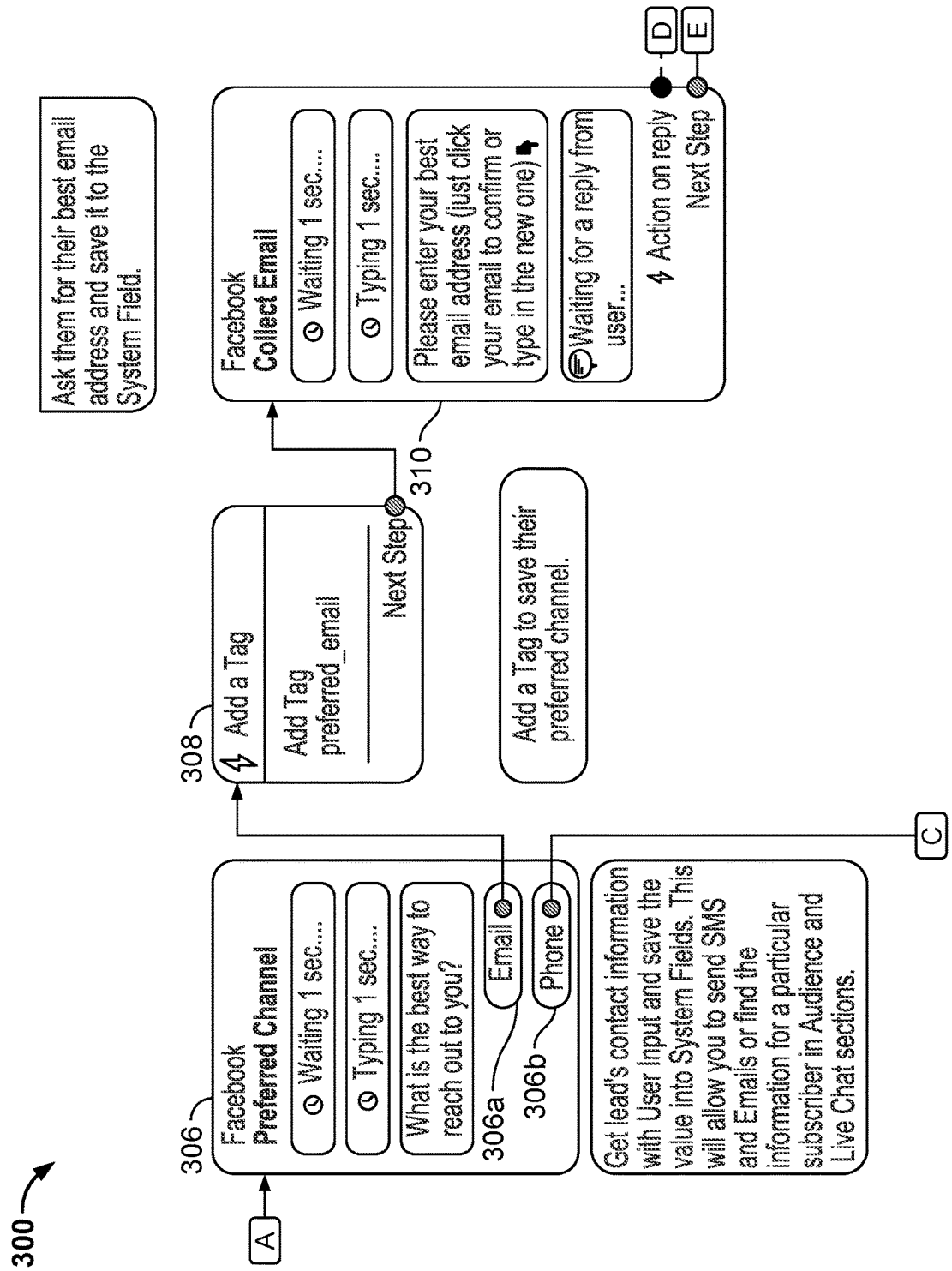
Figure 3C:
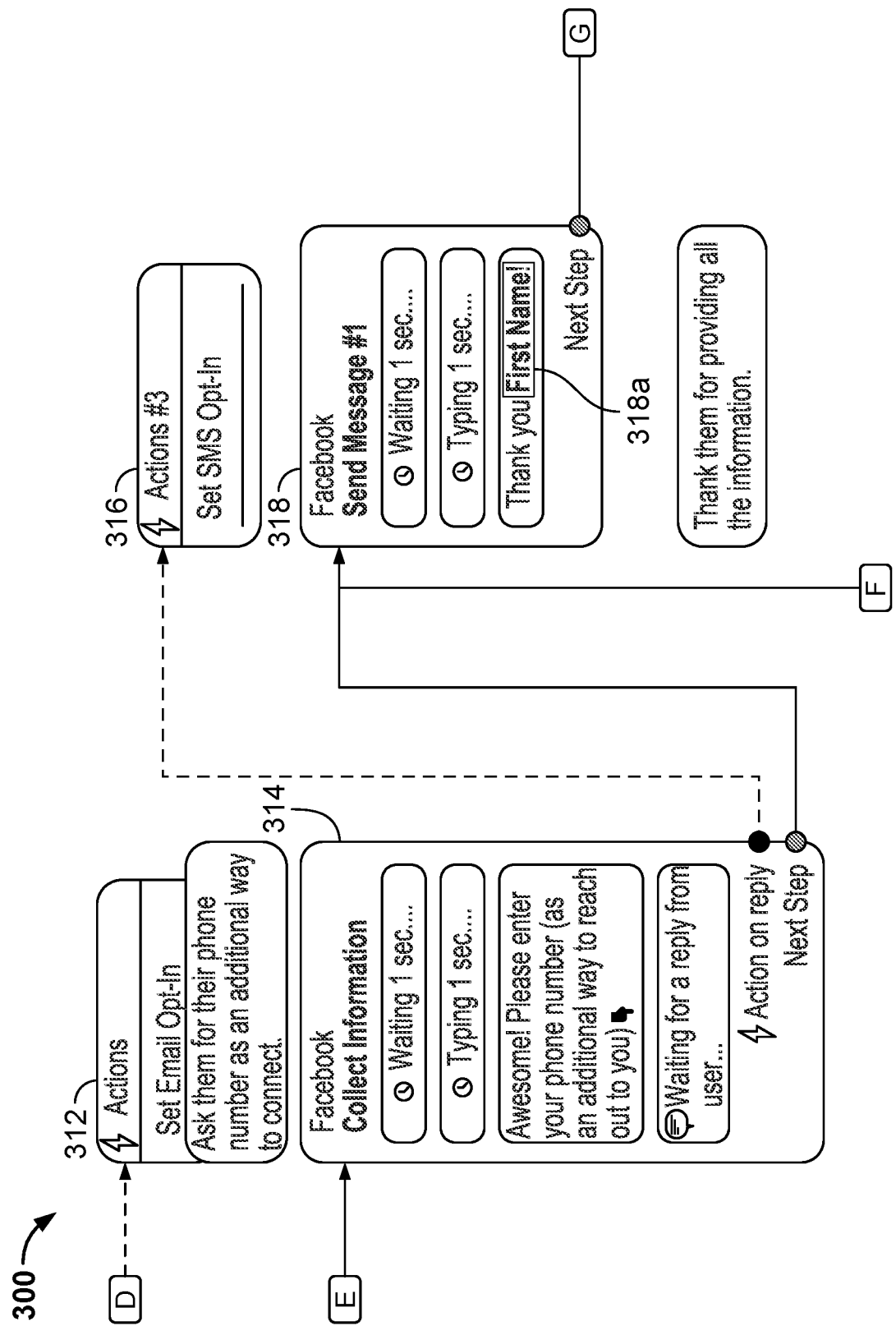
Figure 3D:
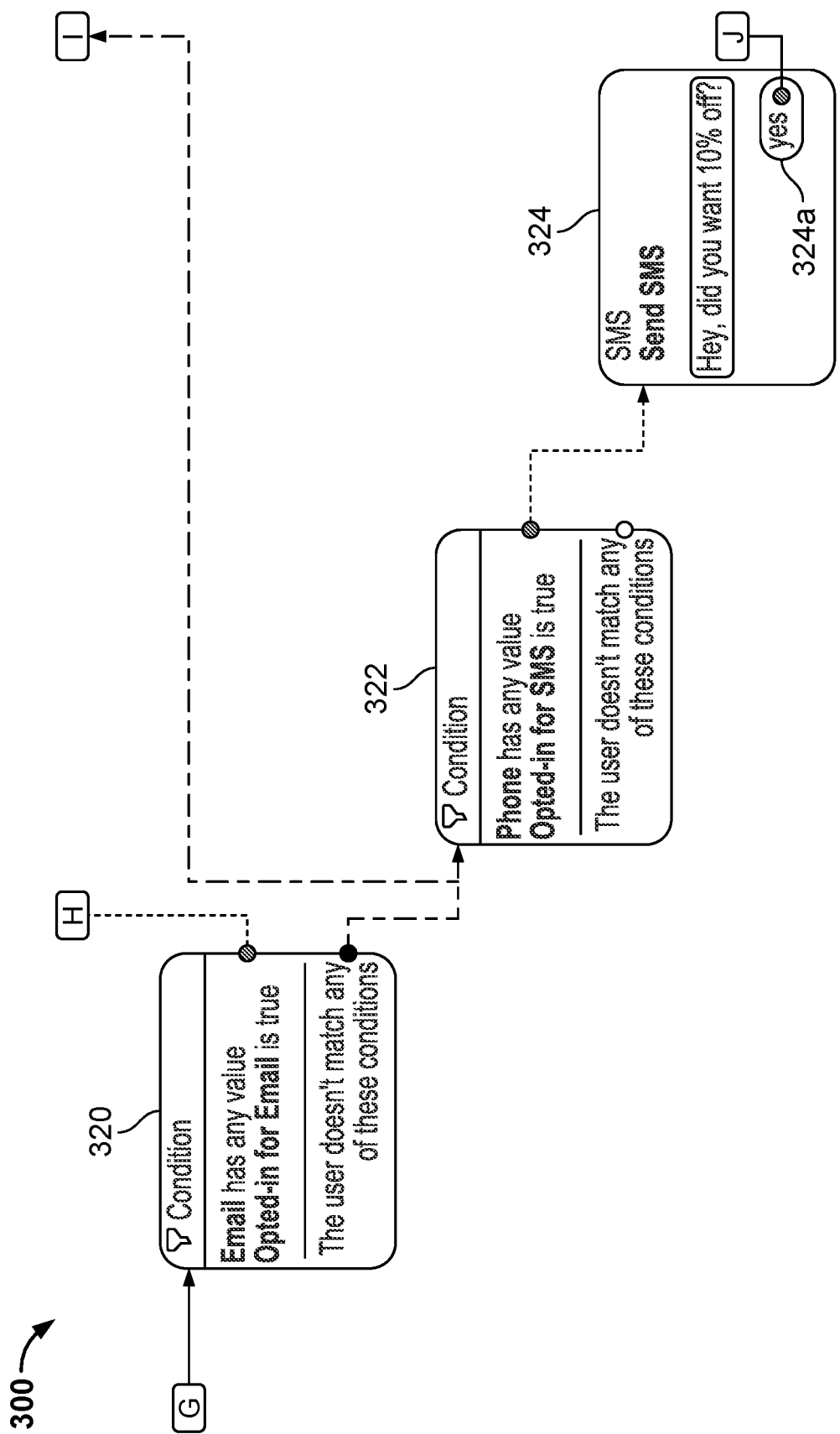
Figure 3E:
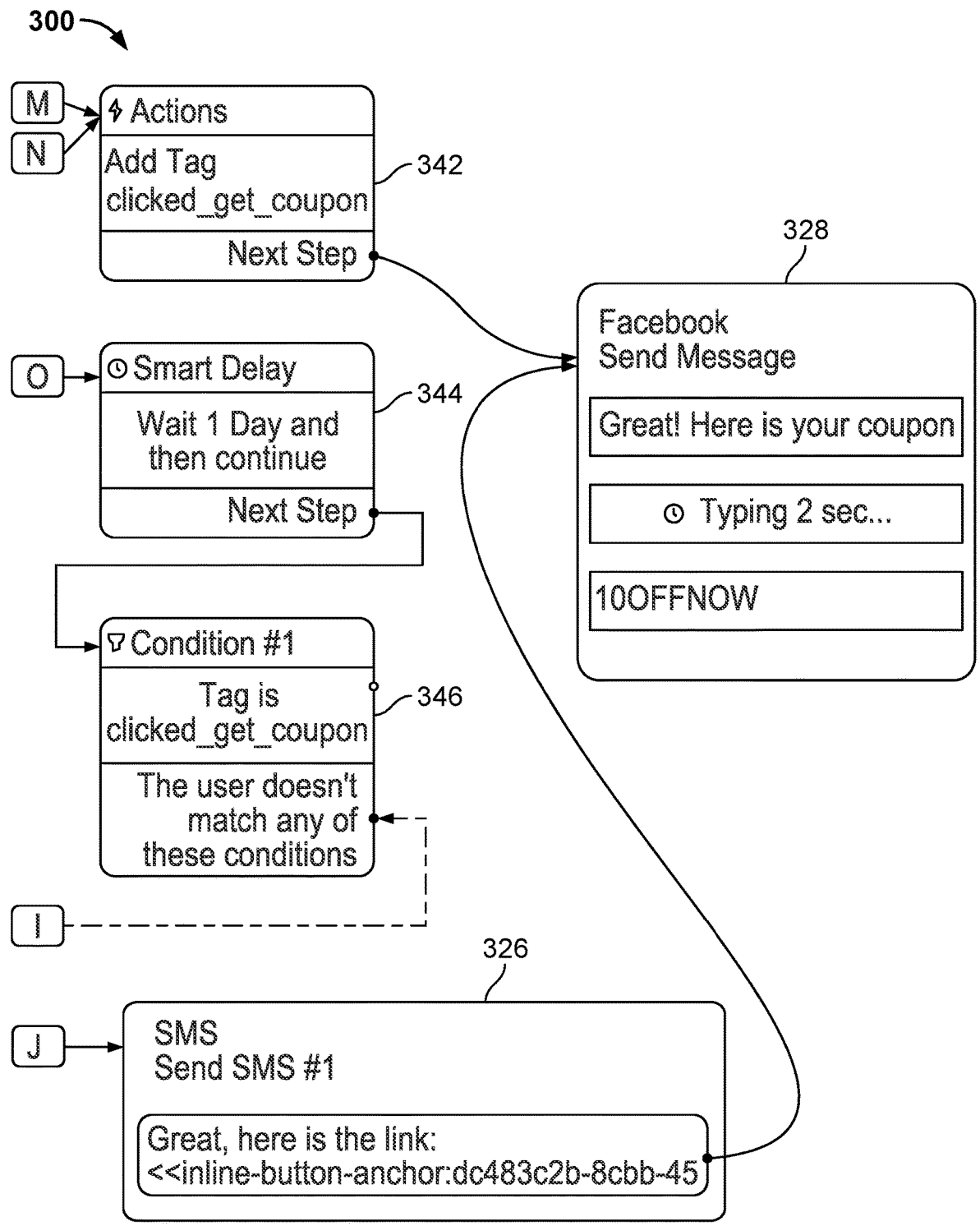
Figure 3F:
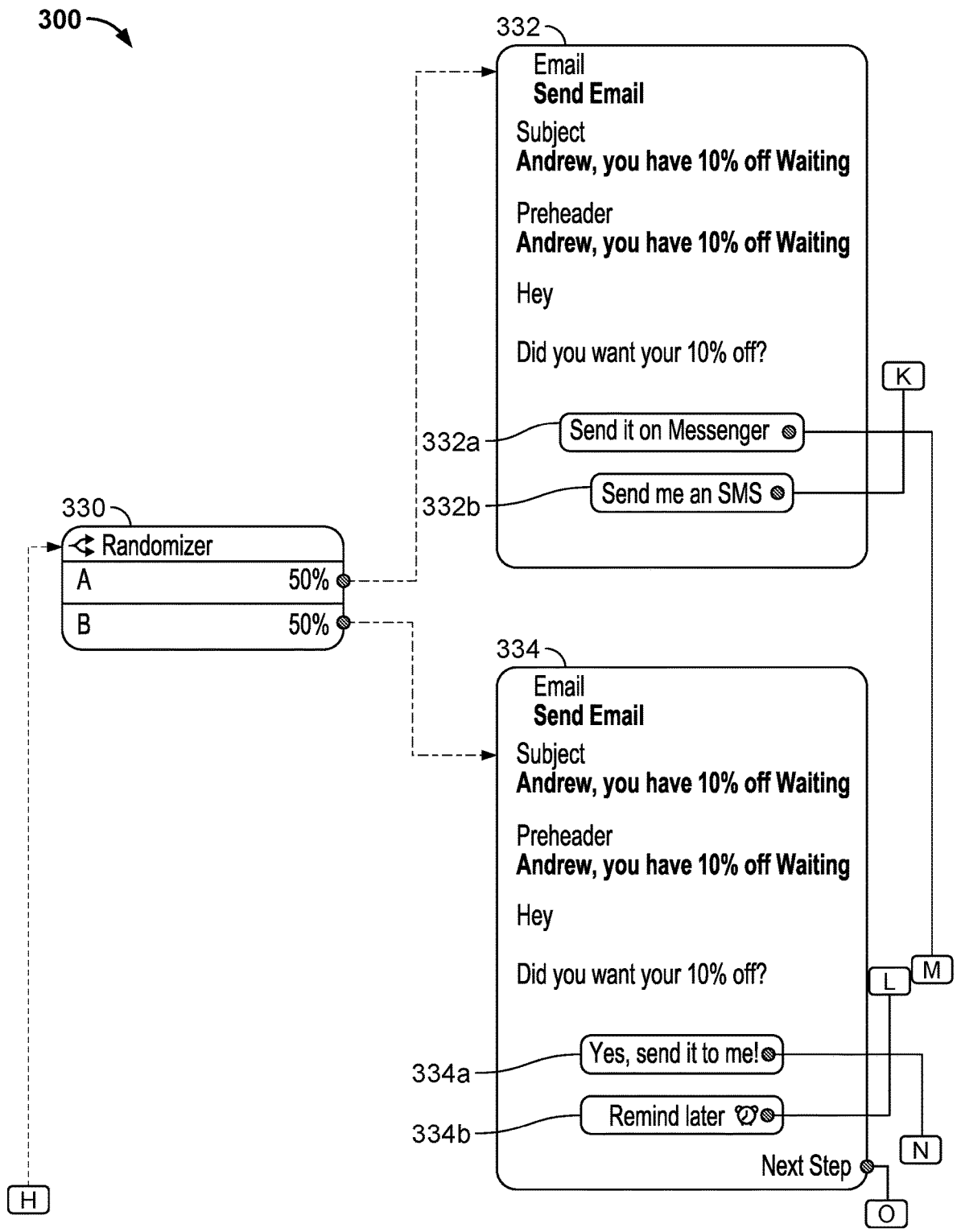
Figure 3G:
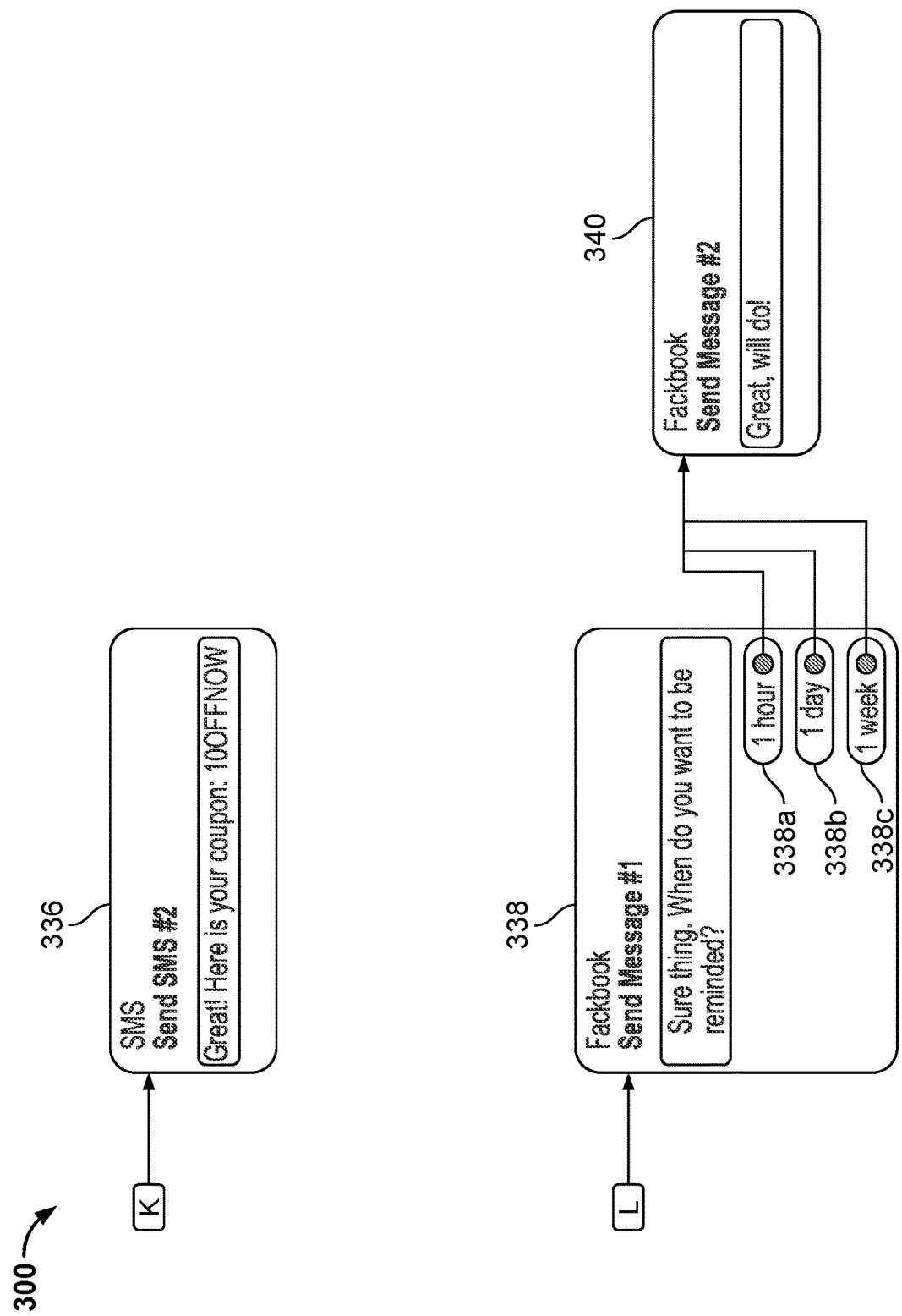
Figure 3H:
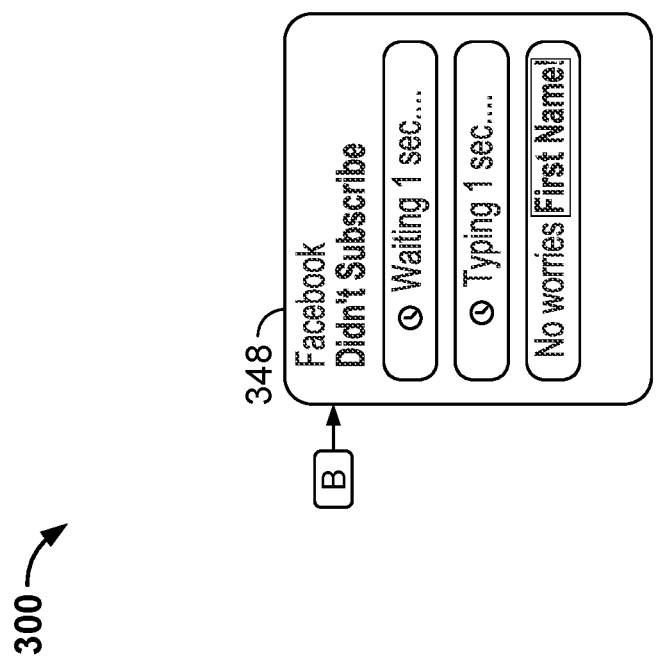
Figure 3I:
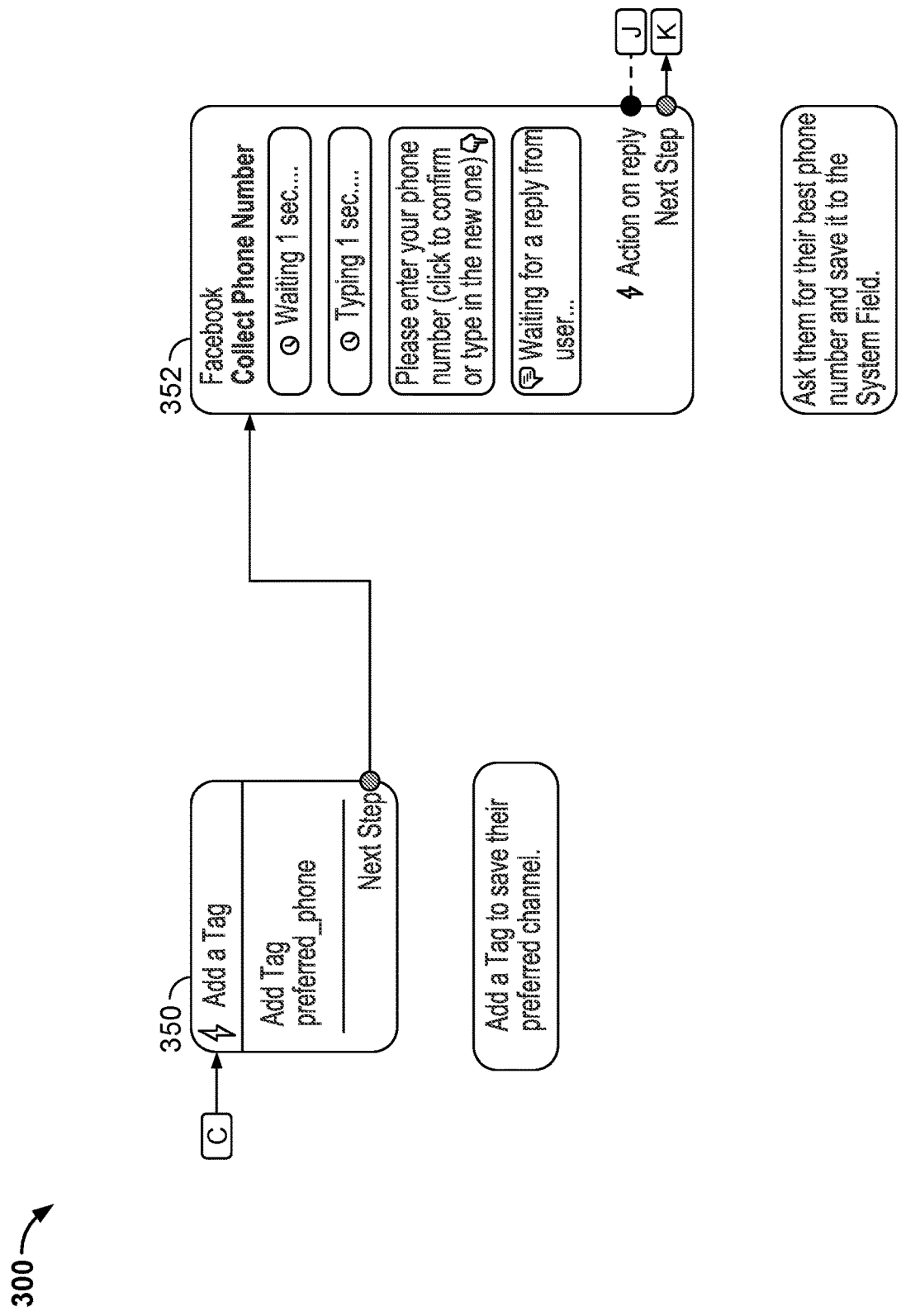
Figure 3J:
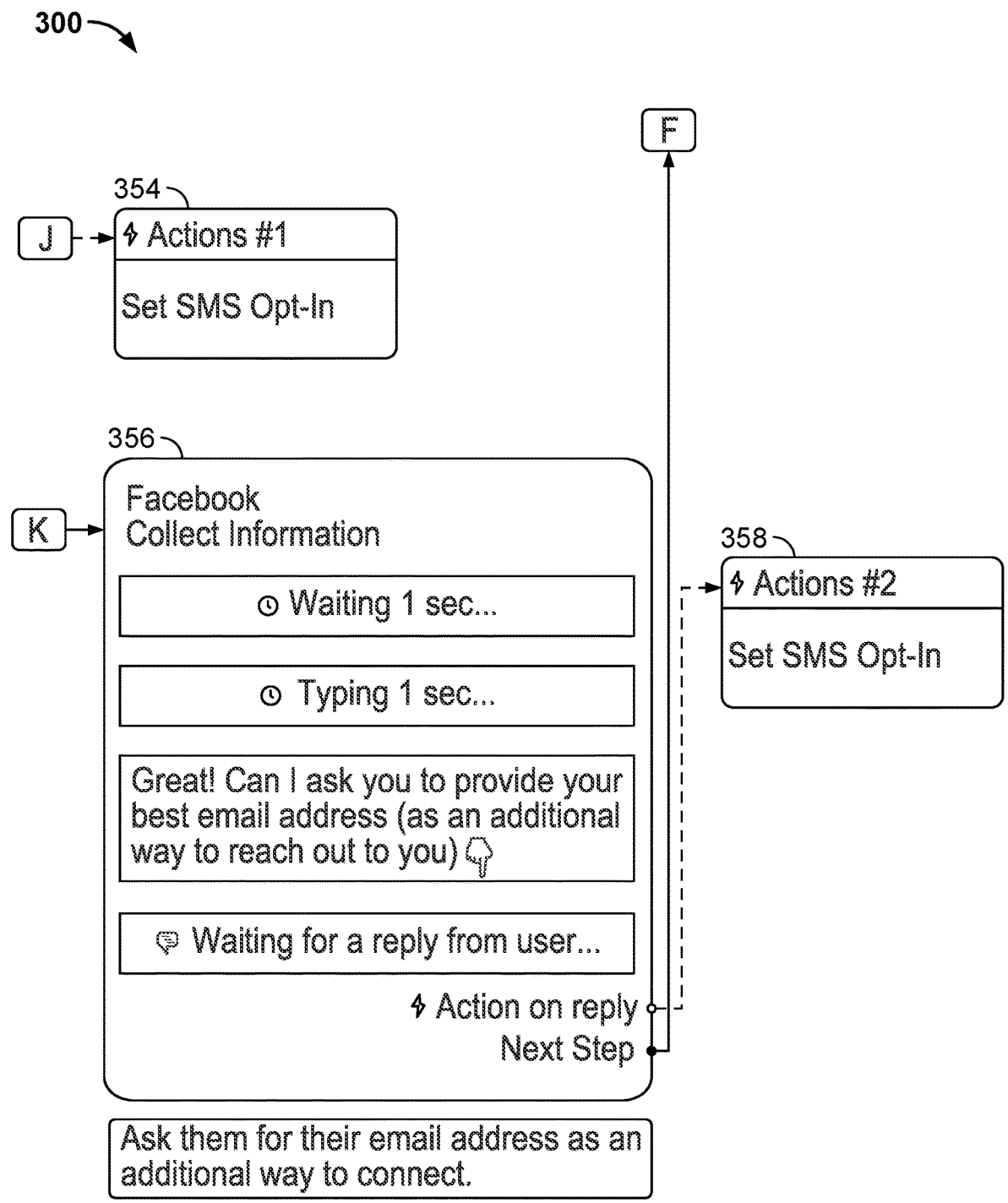

FIG. 2 is a flow diagram illustrating a process of communicating over a plurality of communication channels in accordance with some embodiments. In the example shown, process 200 may be implemented by an omnichannel communication coordinator, such as omnichannel communication coordinator 120.

At 202, a specification of a logic flow for automatically interacting with a recipient is received. A user associated with an enterprise may provide the logic flow specification to an omnichannel communication coordinator. The logic flow is comprised of a plurality of blocks that specify the manner in which an omnichannel communication coordinator is to communicate with the recipient across a plurality of communication channels. A block may identify the communication channel in which a message associated with a block is provided to the recipient, a time at which the message associated with a block is provided to the recipient, one or more response options for the message, etc.

A reference URL that is associated with a corresponding reference value may be embedded in a response option that is included in a message for a communication channel. Upon selection of the response option, the reference URL and the corresponding reference value may be provided to a different communication channel. This may enable a chatbot associated with the different communication channel to resume the conversation with the message recipient from a specific block within the logic flow.

At 204, the logic flow is deployed. An initial block of the logic flow may include a chatbot associated with a first communication channel engaging the message recipient and obtaining contact information associated with the message recipient. For example, the chatbot associated with the first communication channel may obtain contact information for a second communication channel (e.g., email) or a third communication channel (e.g., SMS).

After the contact information is obtained, as per the logic flow, an omnichannel communication coordinator may contact the message recipient via a communication channel that is different from the first communication channel. In some embodiments, a response from the message recipient may indicate a preference order for other communication channels. For example, the omnichannel communication coordinator may select email as the communication channel to communicate with the message recipient and if the recipient is non-responsive, the omnichannel communication coordinator may select SMS as the communication channel to communicate with the message recipient.

In some embodiments, the omnichannel communication coordinator may select a communication channel based on a cost associated with contacting the message recipient via the selected communication channel. For example, a cost associated with sending an email to the message recipient may be less than the cost associated with sending an SMS to the message recipient.

In some embodiments, the omnichannel communication coordinator may select a communication channel based on the message recipient's previous behavior. For example, a message recipient may have provided its email address and phone number. The message recipient may ignore emails but is more responsive to SMS messages. The omnichannel communication coordinator may select SMS as the communication channel based on this particular message recipient's previous behavior.

In some embodiments, the omnichannel communication coordinator may select the last used communication channel as the communication channel.

In some embodiments, the omnichannel communication coordinator may select a communication channel based on information known about the message recipient. For example, information known about the recipient may include age, location, income, sex, political affiliation, education, interests, affiliations, family members, etc. The information known about the message recipient may be represented as a feature vector and inputted to a machine learning model that is trained to select a communication channel. The machine learning model may compare the feature vector associated with the message recipient with feature vectors associated with other message recipients. The machine learning model may determine that other message recipients with a feature vector similar to the feature vector associated with the message recipient prefer to communicate with a particular communication channel. The omnichannel communication coordinator may select the communication channel based on the output of the machine learning model.

In some embodiments, the omnichannel communication coordinator selects a communication channel based on a lead score associated with the message recipient. The lead score associated with the message recipient may be based on how fast the recipient opens a message, how fast the message recipient responds to emails, how fast the message recipient responds to SMS messages, how long the message recipient engages with an email, whether the message recipient actually clicks on any links included in an email, whether the message recipient actually clicks on any links included in an SMS message, etc. A corresponding lead score may be determined for each of the communication channels associated with the message recipient. The omnichannel communication coordinator may select the communication with the highest lead score for the message recipient.

In some embodiments, the message recipient receives a communication from the first communication channel after communicating via a different communication channel. The first communication channel may include a chatbot to communicate with visitors to the first communication channel. Instead of restarting a conversation with the chatbot, the different communication channel may provide a reference URL that includes a reference value associated with the conversation to the chatbot associated with the first communication channel. The chatbot associated with the first communication channel may provide the reference value associated with the conversation to the omnichannel communication coordinator. The omnichannel communication coordinator may use the reference value associated with the conversation to determine a resume conversation block of the logic flow specified at 202 and provide the message associated with the determined block to the chatbot associated with the first communication channel. The chatbot associated with the first communication channel may resume the conversation and provide the message associated with the determined block to the message recipient via the first communication channel.

FIGS. 3A-3J is an example of a specification of a logic flow in accordance with some embodiments. In the example shown, logic flow 300 may be specified by an enterprise, such as enterprise 130. Logic flow 300 is an example of a logic flow specification that may be received at step 202 of process 200. Omnichannel communication coordinator 120 may implement logic flow 300 across a plurality of communication channels, such as communication channels 112, 114, 116. Omnichannel communication coordinator 120 may provide a communication flow builder, such as communication flow builder 125, that enables enterprises to generate logic flows specific for their type of customers, industry, marketing budget, etc.

Logic flow 300 includes an initial block 302 that initiates the logic flow. Block 302 is connected to block 304. A chatbot associated with a first communication channel, such as a social media platform, may provide the message indicated by block 304. A user associated with an enterprise may specify the amount of time before the message included in block 304 is provided to a potential customer (also referred to as a "lead" herein) to the first communication channel. The user associated with the enterprise may also specify a plurality of response options 304a, 304b. In the event a potential customer to the first communication channel selects option 304a, logic flow 300 proceeds to block 306. In the event a potential customer to the communication channel selects option 304b, logic flow 300 proceeds to block 348.

At block 304, the chatbot associated with the first communication channel may provide the message included in block 304 (i.e., "Hi First Name! Thank you for touring our store. Do you want to get reminders about our best deals and updates?"). The message may include a dynamic field 304c that is to be auto-filled by the first communication channel.

At block 306, the chatbot associated with the first communication channel may provide the message included in block 306 (i.e., "What is the best way to reach out to you?"). The user associated with the enterprise may also specify a plurality of response options 306a, 306b. In the event a potential customer to the first communication channel selects option 306a, logic flow 300 proceeds to block 308. In the event a potential customer to the first communication channel selects option 306b, logic flow 300 proceeds to block 350.

At block 308, a tag "preferred_email" is added to a customer profile. At block 310, the chatbot associated with the first communication channel provides the message included in block 310 (i.e., "Please enter your best email address (just click your email to confirm or type in the new one)"). The communication flow builder may enable a user associated with an enterprise to specify an action to perform in response to a reply to the message provided in block 310. Block 312 indicates a field "Email Opt-In" of the customer profile is enabled when the reply includes an email address. This enables the enterprise to communicate with the potential customer using a second communication channel (e.g., email). The field "Email Opt-In" is not enabled when the reply does not include an email address.

At block 314, the chatbot associated with the first communication channel provides the message included in block 314 (e.g., "Awesome! Please enter your phone number (as an additional way to reach out to you)"). The communication flow builder may enable a user associated with an enterprise to specify an action to perform in response to a reply to the message provided in block 314. Block 316 indicates a field "SMS Opt-In" of the customer profile is enabled when the reply includes a phone number. This enables the enterprise to communicate with the potential customer using a third communication channel (e.g., SMS). The field "SMS Opt-In" is not enabled when the reply does not include a phone number.

At block 318, the chatbot associated with the first communication channel provides the message included in block 318 (e.g., "Thank you First Name!"). The message may include a dynamic field 318a that is to be auto-filled by the first communication channel.

The communication flow builder enables a user associated with an enterprise to specify conditions for following up with a potential customer, such as when and how to follow up with the potential customer. At block 320, the omnichannel communication coordinator determines whether the customer profile includes a value for an "email" field and whether the value for a "Opted-in for Email" field is true (e.g., enabled). In the event the customer profile associated with the potential customer includes a value for an "email" field and the value for a "Opted-in for Email" field is true, logic flow 300 proceeds to block 330. In the event the customer profile associated with the potential customer does not include a value for an "email" field or the value for a "Opted-in for Email" field is false, logic flow 300 proceeds to block 322.

At block 322, the omnichannel communication coordinator determines whether the customer profile includes a value for a "Phone" field and whether the value for a "Opted-in for SMS" field is true (e.g., enabled). In the event the customer profile includes a value for a "Phone" field and the value for a "Opted-in for SMS" field is true, logic flow 300 proceeds to block 324. In the event the customer profile associated with the potential customer does not include a value for a "phone" field or the value for a "Opted-in for SMS" field is false, logic flow 300 ends in this example. In other embodiments, the omnichannel communication coordinator may determine whether there are other communication channels in which to contact the potential customer.

At block 324, the omnichannel communication coordinator sends to the potential customer the message included in block 324 (e.g., "Hey, did you want 10% off?") via the third communication channel. Block 324 includes an option 324a of "Yes." In some embodiments, block 324 includes another option of "No." In response to a response of "Yes," logic flow 300 proceeds to block 326. In some embodiments, a potential customer may ignore the message and not respond.

At block 326, the omnichannel communication coordinator may send the message included in block 326 to the phone number provided by the potential customer at block 314. The message may include a link that is a reference URL that includes a reference value associated with the conversation. In response to the potential customer clicking the link, the reference value associated with the conversation included in the reference URL is provided to a chatbot associated with the first communication channel. In response to receiving the reference value associated with the conversation, the chatbot associated with the first communication channel provides the reference value associated with the conversation to the omnichannel communication coordinator. The omnichannel communication coordinator uses the reference value associated with the conversation to determine a resume communication block of logic flow 300. In response to determining the resume communication block, the omnichannel communication coordinator provides the messages included in block 328 to the chatbot associated with the first communication channel. The chatbot associated with the first communication channel subsequently provides the messages to the potential customer via the first communication channel.

A user associated with an enterprise may want to perform AB testing to determine the effectiveness of different messages. The communication flow builder enables the user associated with the enterprise to create a randomizer block, such as block 330, which causes logic flow 300 to proceed to block 332 or block 334. The user associated with the enterprise may specify the ratio between block 332 and block 334. In the example shown, at block 330, logic flow 300 has a 50% chance of proceeding to block 332 and a 50% chance of proceeding to block 334.

At block 332, the omnichannel communication coordinator provides the message included in block 332 via the second communication channel. Block 332 includes response options 332a, 332b. In response to the potential customer selecting response option 332a, logic flow 300 proceeds to block 342. A reference URL that includes a reference value associated with the conversation may be embedded in response option 332a. In response to the potential customer selecting response option 332a, the reference value associated with the conversation included in the reference URL is provided to a chatbot associated with the first communication channel. In response to receiving the reference value associated with the conversation, the chatbot associated with the first communication channel provides the reference value associated with the conversation to the omnichannel communication coordinator. The omnichannel communication coordinator uses the reference value associated with the conversation to determine a resume communication block of logic flow 300. In response to determining the resume communication block, the omnichannel communication coordinator provides the messages included in block 328 to the chatbot associated with the first communication channel. The chatbot associated with the first communication channel subsequently provides the messages to the potential customer via the first communication channel. In response to the potential customer selecting response option 332b, logic flow 300 proceeds to block 336.

At block 334, the omnichannel communication coordinator provides the message included in block 334 via the second communication channel. Block 334 includes response options 334a, 334b. In response to the potential customer selecting response option 334a, logic flow 300 proceeds to block 342. A reference URL that includes a reference value associated with the conversation may be embedded in response option 334a. In response to the potential customer selecting response option 334a, the reference value associated with the conversation included in the reference URL is provided to a chatbot associated with the first communication channel. In response to receiving the reference value associated with the conversation, the chatbot associated with the first communication channel provides the reference value associated with the conversation to the omnichannel communication coordinator. The omnichannel communication coordinator uses the reference value associated with the conversation to determine a resume communication block of logic flow 300. In response to determining the resume communication block, the omnichannel communication coordinator provides the messages included in block 328 to the chatbot associated with the first communication channel. The chatbot associated with the first communication channel subsequently provides the messages to the potential customer via the first communication channel.

In response to the potential customer selecting response option 334b, logic flow 300 proceeds to block 338. A reference URL that includes a reference value associated with the conversation may be embedded in response option 334b. In response to the potential customer selecting response option 334b, the reference value associated with the conversation included in the reference URL is provided to a chatbot associated with the first communication channel. In response to receiving the reference value associated with the conversation, the chatbot associated with the first communication channel provides the reference value associated with the conversation to the omnichannel communication coordinator. The omnichannel communication coordinator uses the reference value associated with the conversation to determine a resume communication block of logic flow 300. In response to determining the resume communication block, the omnichannel communication coordinator provides the message included in block 338 to the chatbot associated with the first communication channel. The chatbot associated with the first communication channel subsequently provides the message to the potential customer via the first communication channel. In response to the potential customer not selecting either of response options 334a, 334b, logic flow 300 proceeds to block 344.

At block 336, the omnichannel communication coordinator provides the message included in block 336 (e.g., "Great! Here is your coupon: 10OFFNOW") to the potential customer via the third communication channel.

At block 338, the chatbot associated with the first communication channel provides the message included in block 338 (e.g., "Sure thing. When do you want to be reminded?"). The message may include response options 338a, 338b, 338c. In response to a selection of either response option 338a, 338b, or 338c, logic flow 300 proceeds to 340.

At block 340, the chatbot associated with the first communication channel provides the message included in block 340 (e.g., "Great, will do!"). The omnichannel communication coordinator may be configured to send a reminder message at a later time based on which of the response options in block 338 was selected.

At block 342, a tag "clicked_get_coupon" is added to the customer profile. Logic flow 300 proceeds to block 328 after the tag is added to the customer profile.

The communication flow builder may enable a user associated with an enterprise to specify when follow-up messages are to be sent to a customer. In this example at block 344, the user associated with the enterprise has specified a delay of one day. Block 346 determines whether the customer profile has the tag "clicked_get_coupon." In the event the potential customer has not clicked on a response option to get a coupon, logic flow 300 returns to block 322 where the omnichannel communication coordinator attempts to send a coupon to the potential customer via the third communication channel.

At block 348, the chatbot associated with the first communication channel provides the message included in block 304.

At block 350, a tag "preferred_phone" is added to a customer profile. At block 352, the chatbot associated with the first communication channel provides the message included in block 352 (i.e., "Please enter your phone number (click to confirm or type in the new one)"). The communication flow builder may enable a user associated with an enterprise to specify an action to perform in response to a reply to the message provided in block 352. Block 354 indicates a field "SMS Opt-In" is enabled when the reply includes a phone number. This enables the enterprise to communicate with the potential customer using a third communication channel (e.g., SMS). The field "SMS Opt-In" is not enabled when the reply does not include a phone number.

At block 356, the chatbot associated with the first communication channel provides the message included in block 356 (i.e., "Great! Can I ask you to provide your best email address (as an additional way to reach out to you)"). The communication flow builder may enable a user associated with an enterprise to specify an action to perform in response to a reply to the message provided in block 356. Block 358 indicates a field "Email Opt-In" is enabled when the reply includes an email address. This enables the enterprise to communicate with the potential customer using a second communication channel (e.g., email). The field "Email Opt-In" is not enabled when the reply does not include an email address. Logic flow 300 proceeds to block 318.

Figure 4:
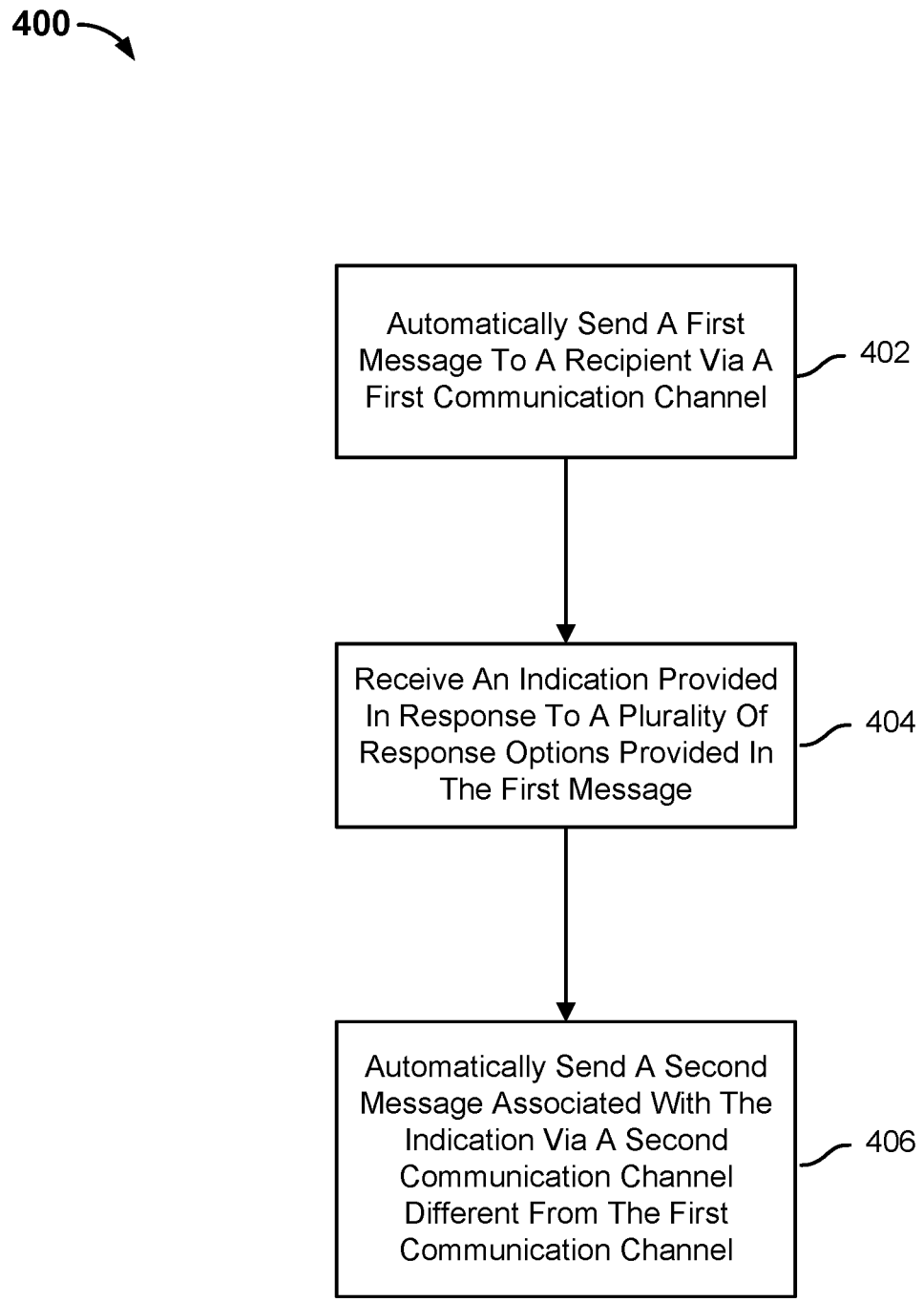
FIG. 4 is a flow diagram illustrating a process of deploying a logic flow in accordance with some embodiments.

FIG. 4 is a flow diagram illustrating a process of deploying a logic flow in accordance with some embodiments. In the example shown, process 400 may be implemented by an omnichannel communication coordinator, such as omnichannel communication coordinator 120. In some embodiments, process 400 may be implemented to perform some of step 204 of process 200.

At 402, a first message is automatically sent to a message recipient via a first communication channel. A block within a logic flow may indicate that an omnichannel communication coordinator is to automatically send the first message to the message recipient via the first communication channel. For example, the omnichannel communication coordinator may send an email to the message recipient. The block may indicate the content of the first message. The block may also indicate when the first message is to be automatically sent to the message recipient. The first message may include a plurality of response options. A reference URL that is associated with a corresponding reference associated with the conversation (e.g., unique code) may be embedded in one or more of the response options.

At 404, an indication provided in response to a plurality of response options provided in the first message is received. The message recipient may select a response option that includes the embedded reference URL that is associated with the reference value associated with the conversation. Selecting the response option may cause the reference URL to be sent to a second communication channel. A chatbot associated with the second communication channel (e.g., a social media platform) may determine that the reference URL includes the reference value associated with the conversation. The omnichannel communication coordinator may receive from the chatbot associated with the second communication channel an indication that includes the reference value associated with the conversation.

At 406, a second message associated with the indication is automatically sent via a second communication channel that is different from the first communication channel. The omnichannel communication coordinator may use the reference associated with the conversation to determine a resume communication block for the message recipient. The recipient may have previously communicated with an enterprise across one or more communication channels. Instead of restarting a communication with the enterprise from the beginning of the logic flow, the omnichannel communication coordinator may determine the resume communication block for the message recipient so that communications between the enterprise and the message recipient can resume from the last communication.

In response to determining the resume communication block for the message recipient, the omnichannel communicator coordinator provides the second message that is included in the resume communication block to the chatbot associated with the second communication channel, which then provides the second message to a device associated with the message recipient.

The omnichannel communication system provides an enterprise with the ability to conduct a continuous conversation with customers across a plurality of communication channels instead of having discrete and disconnected conversations with customers.

Figure 5:
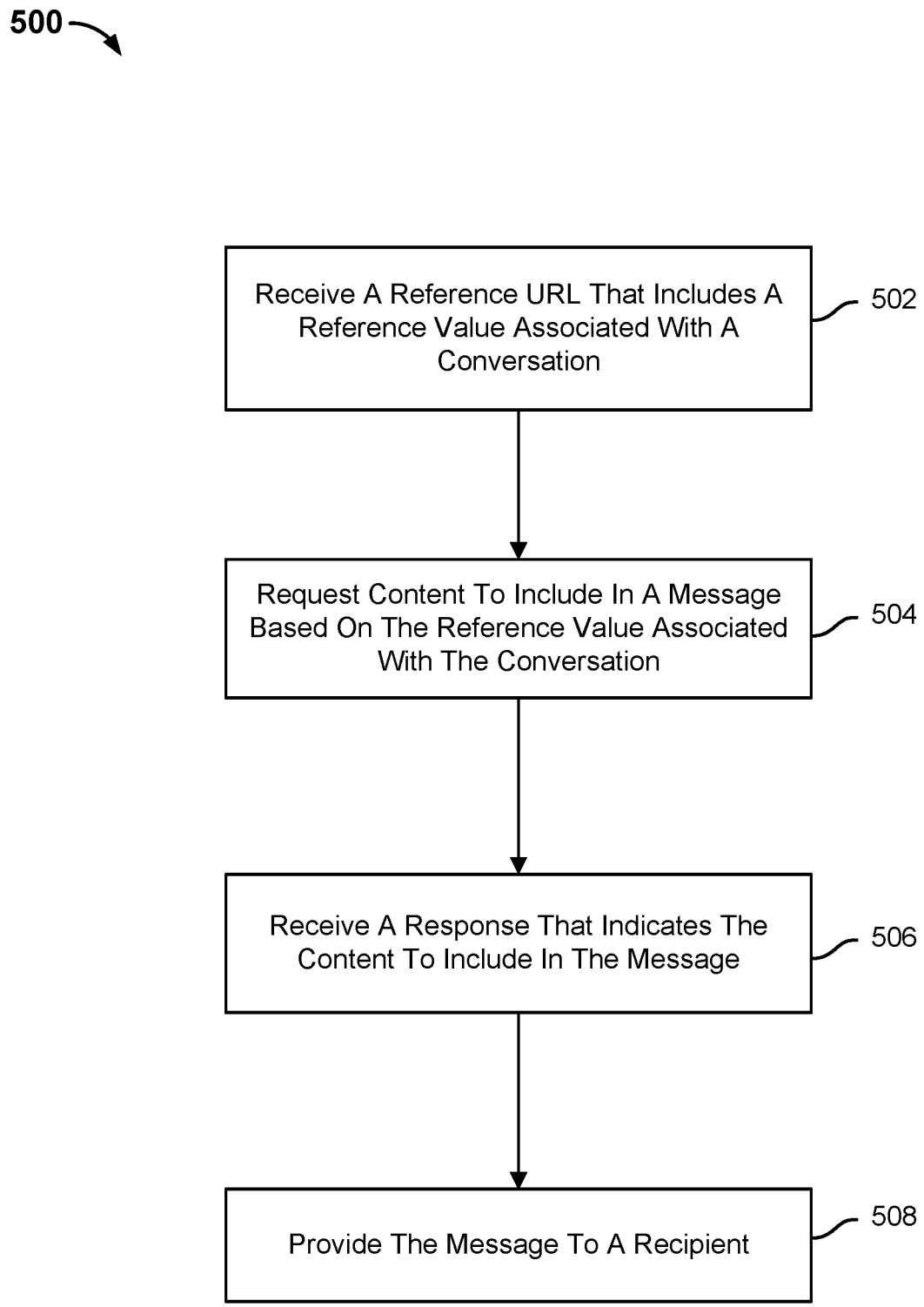
FIG. 5 is a flow diagram illustrating a process of providing a message in accordance with some embodiments.

FIG. 5 is a flow diagram illustrating a process of providing a message in accordance with some embodiments. In the example shown, process 500 may be implemented by a communication channel, such as communication channel 112, 114, or 116.

At 502, a reference URL that includes a reference value associated with a conversation is received. A message in a different communication channel may include one or more response options. A response option may embed the reference URL that includes the reference value associated with the conversation (e.g., a unique code). In response to a message recipient selection of the response option, a chatbot associated with a communication channel may receive the reference URL that includes the reference value associated with the conversation from the different communication channel.

At 504, content to include in a message is requested based on the reference value associated with the conversation. The chatbot associated with the communication channel may send to an omnichannel communication coordinator a request for content to include in a message based on the reference value associated with the conversation. The request may be received by the omnichannel communication coordinator at step 404 of process 400.

At 506, a response that indicates the content to include in the message is received. In response to receiving the reference value associated with the conversation, the omnichannel communication coordinator may determine a resume communication block of a logic flow associated with an enterprise and provide a message associated with the resume communication block.

At 508, the message is provided to a recipient.

Figure 6:
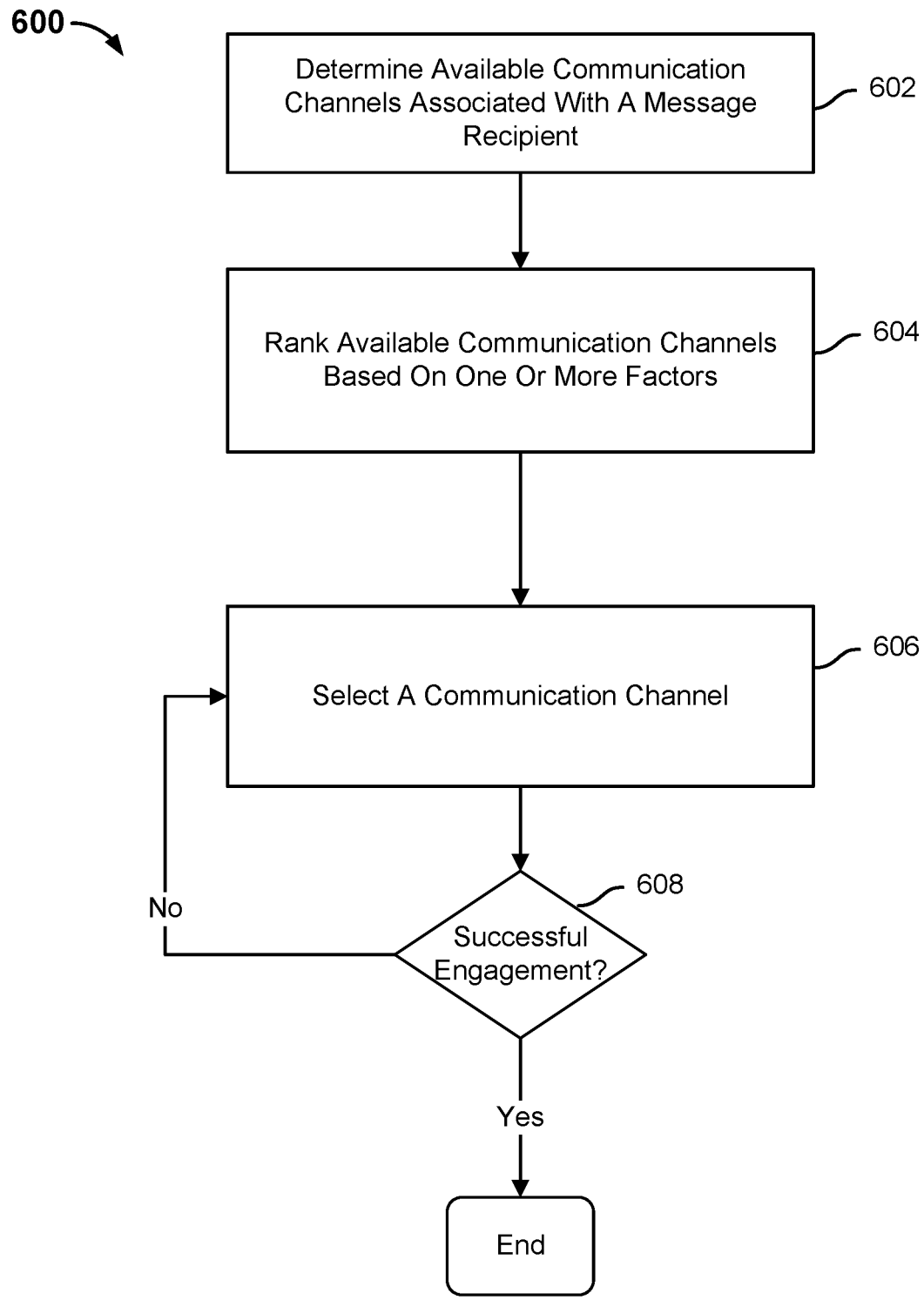
FIG. 6 is a flow diagram illustrating a process of engaging a customer in accordance with some embodiments.

FIG. 6 is a flow diagram illustrating a process of engaging a customer in accordance with some embodiments. In the example shown, process 600 may be implemented by an omnichannel communication coordinator. In some embodiments, process 600 is implemented to perform some of step 204 of process 200. In some embodiments, process 600 is implemented to perform some of step 402 of process 400.

At 602, available communication channels associated with a message recipient are determined. A message recipient may have provided a first communication channel contact information associated with one or more other communication channels. For example, a chatbot associated with a social media platform may have obtained an email address and/or a phone number associated with the message recipient. The chatbot associated with the social media platform may provide the obtained contact information to an omnichannel communication coordinator. The omnichannel communication coordinator may store the obtained contact information in a database that stores a customer profile for the message recipient. The omnichannel communication coordinator may inspect the customer profile to determine the available communication channels associated with the message recipient.

At 604, the available communication channels are ranked based on one or more factors. The one or more factors may include whether the message recipient opened a previous message using the communication channel, the amount of time needed by the message recipient to open a previous message on the communication channel after the message is sent to the message recipient, whether the message recipient engaged with the previous message (e.g., click on a link included in the previous message), how long the message recipient had the previous message open, whether the message recipient deleted the previous message without opening the previous message, etc.

At 606, a communication channel is selected. The communication channel with the highest rank is selected. In some embodiments, the communication channel with the highest rank is selected and a message recipient does not engage with a message on the selected communication channel. In that scenario the communication channel with the next highest rank is selected.

In some embodiments, the omnichannel communication coordinator may select a communication channel based on a cost associated with contacting the message recipient via the selected communication channel. For example, a cost associated with sending an email to the message recipient may be less than the cost associated with sending an SMS to the message recipient.

In some embodiments, the omnichannel communication coordinator may select a communication channel based on the message recipient's previous behavior. For example, a message recipient may have provided its email address and phone number. The message recipient may ignore emails but is more responsive to SMS messages. The omnichannel communication coordinator may select SMS as the communication channel based on this particular message recipient's previous behavior.

In some embodiments, the omnichannel communication coordinator may select the last used communication channel as the communication channel.

In some embodiments, the omnichannel communication coordinator may select a communication channel based on information known about the message recipient. For example, information known about the message recipient may include age, location, income, sex, political affiliation, education, interests, affiliations, family members, etc. The information known about the message recipient may be represented as a feature vector and inputted to a machine learning model that is trained to select a communication channel. The machine learning model may compare the feature vector associated with the message recipient with feature vectors associated with other people. The machine learning model may determine that other people with a feature vector similar to the feature vector associated with the message recipient prefer to communicate with a particular communication channel. The omnichannel communication coordinator may select the communication channel based on the output of the machine learning model.

In some embodiments, the omnichannel communication coordinator selects a communication channel based on a lead score associated with the message recipient. The lead score associated with the message recipient may be based on how fast the message recipient opens a message, how fast the message recipient responds to emails, how fast the message recipient responds to SMS messages, how long the message recipient engages with an email, whether the message recipient actually clicks on any links included in an email, whether the message recipient actually clicks on any links included in an SMS message, etc. A corresponding lead score may be determined for each of the communication channels associated with the message recipient. The omnichannel communication coordinator may select the communication with the highest lead score for the message recipient.

At 608, it is determined whether the selected communication channel resulted in a successful engagement. In some embodiments, a successful engagement occurs when a message recipient clicks on a link included in a message. In some embodiments, a successful engagement occurs when a message recipient responds to the message via the selected communication channel. In some embodiments, a successful engagement occurs when the message recipient opens the message.

In the event the selected communication channel resulted in a successful engagement, process 600 ends. In the event the selected communication channel did not result in a successful engagement, process 600 returns to 606 where a different communication channel is selected.

Figure 7:
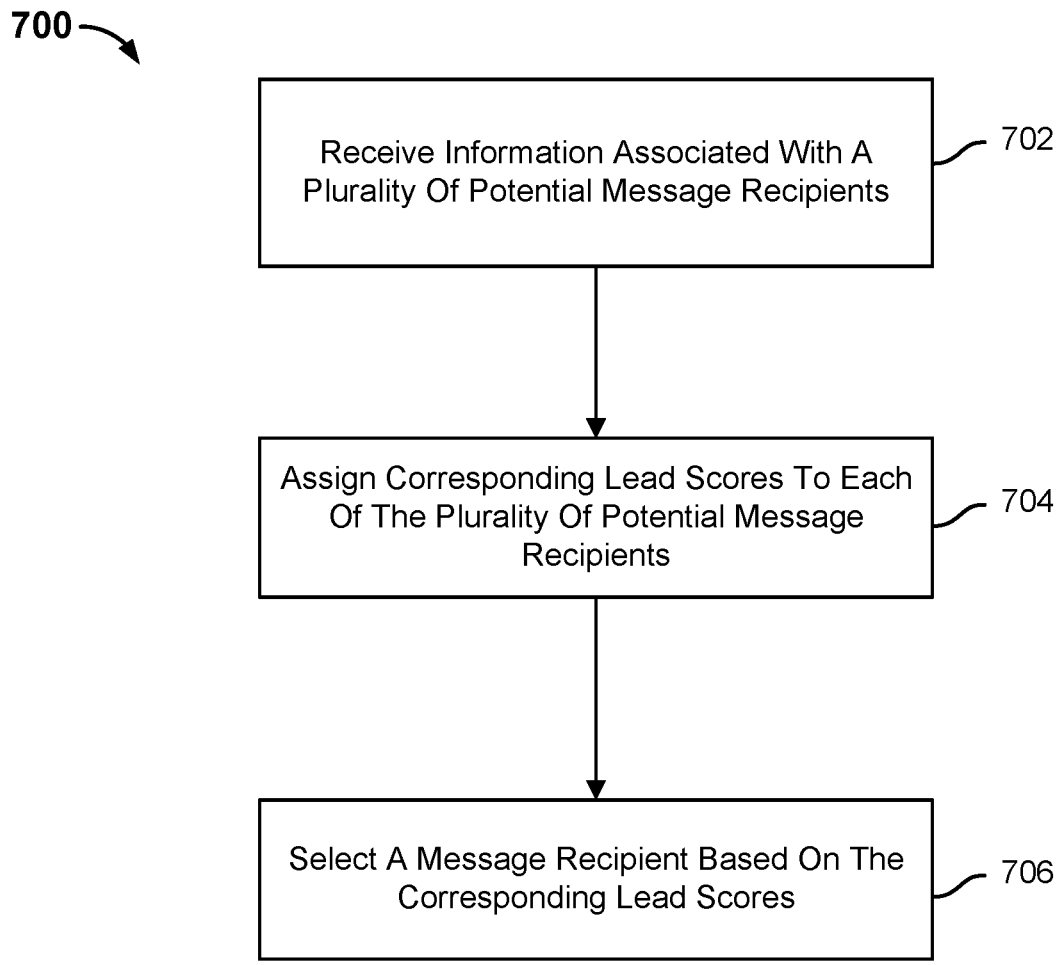
FIG. 7 is a flow diagram illustrating a process of selecting a recipient of a message in accordance with some embodiments.

FIG. 7 is a flow diagram illustrating a process of selecting a recipient of a message in accordance with some embodiments. In the example shown, process 700 may be implemented by an omnichannel communication coordinator, such as omnichannel communication coordinator 120. In some embodiments, process 700 is implemented to perform some of step 402 of process 400.

At 702, contact information associated with a plurality of potential message recipients is received. A chatbot associated with a communication channel may receive contact information associated with a plurality of potential message recipients. A potential message recipient may have indicated that the potential message recipient is interested in receiving further communications from an enterprise.

At 704, corresponding lead scores are assigned to each of the plurality of potential message recipients. The enterprise may have a particular budget for further communications with the potential message recipients. Due to the particular budget, it may not be possible to send follow-up messages to all of the plurality of potential message recipients. For example, there may be a cost associated with sending an SMS message to a potential message recipient.

A lead score is assigned to each of the plurality of potential message recipients. The lead score indicates the likelihood that a potential message recipient is to engage with a subsequent communication. The lead score may be based on one or more factors, such as how fast the message recipient opens a message, how fast the message recipient responds to emails, how fast the message recipient responds to SMS messages, how long the message recipient engages with an email, whether the message recipient actually clicks on any links included in an email, whether the message recipient actually clicks on any links included in an SMS message, etc.

At 706, a message recipient is selected based on the corresponding lead scores. For example, a message recipient is selected in the event the lead score associated with the message recipient is above a lead score threshold.

FIG. 8 is an example of a unified message interface in accordance with some embodiments. In the example shown, unified message interface 800 may be implemented by an omnichannel communication coordinator, such as omnichannel communication coordinator 120. Omnichannel communication coordinator 120 may provide the unified message interface 800 to an administrator associated with enterprise 130.

In the example shown, unified message interface 800 displays statistics across a plurality of communication channels 802, such as email, Facebook™ Messenger, and SMS.

Unified message interface 800 displays the number of messages sent 804 across each of the communication channels for an enterprise. For example, 199492 emails were sent, 128512 Facebook™ Messenger messages were sent, and 288918 SMS messages were sent.

Unified message interface 800 displays the number of messages delivered 806 by a communication channel. For example, 191506 messages were delivered by email, 127619 messages were sent via Facebook™ Messenger, and 0 messages were delivered by SMS. The corresponding ratio between delivered messages and sent messages may be displayed as a percentage.

Unified message interface 800 displays the number of messages clicked 808 across the plurality of communication channels. For example, 349 emails were clicked, 21343 Facebook™ Messenger messages were clicked, and 288918 SMS messages were clicked. The corresponding ratio between clicked messages and sent messages may be displayed as a percentage.

Unified message interface 800 displays the number of messages read 810 across the plurality of communication channels, if possible. For example, 15053 emails were read and 124039 Facebook™ Messenger messages were read. Unified message interface 800 may be unable to display the number of SMS messages that were read because the omnichannel communication system may be unable to determine that amount. The corresponding ratio between delivered messages and read messages may be displayed as a percentage.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a specification of a logic flow for automatically interacting with a message recipient, wherein the logic flow specifies a dynamic interaction between a plurality of different communication channels for the message recipient, wherein the logic flow includes a plurality of blocks, wherein a first block of the plurality of blocks corresponds to a first message, wherein a second block of the plurality of blocks corresponds to a second message, wherein the first block is linked to the second block; and
deploying the logic flow including by:
automatically sending the first message to the message recipient via a first communication channel, wherein the first message is associated with a first conversation;
receiving an indication provided in response to a plurality of response options provided in the first message; and
in response to the received indication, automatically sending the second message via a second communication channel that is different from the first communication channel, wherein the second message includes content that resumes the first conversation with the message recipient via the first communication channel.

2. The method of claim 1, wherein at least one of the plurality of different communication channels is a social media platform.

3. The method of claim 1, wherein at least one of the plurality of different communication channels is email.

4. The method of claim 1, wherein at least one of the plurality of different communication channels is a short messaging service.

5. The method of claim 1, wherein at least one of the different communication channels is a messaging platform.

6. The method of claim 1, wherein a selection of one of the plurality of response options provided in the first message causes a reference uniform resource location (URL) to be provided to a chatbot associated with the second communication channel.

7. The method of claim 6, wherein the reference URL includes a reference value associated with the first conversation.

8. The method of claim 7, wherein the chatbot associated with the second communication channel provides the indication in response to receiving the reference URL.

9. The method of claim 8, wherein the indication includes the reference value associated the first conversation.

10. The method of claim 9, further comprising determining a resume communication block of the logic flow based on the reference value associated with the first conversation.

11. The method of claim 10, wherein the determined resume communication block includes the content that is included in the second message.

12. The method of claim 1, further comprising determining available communication channels associated with the message recipient.

13. The method of claim 12, further comprising ranking the available communication channels associated with the message recipient based on one or more factors.

14. The method of claim 13, further comprising selecting the first communication channel based on its ranking among the available communication channels.

15. The method of claim 1, further comprising receiving information associated with a plurality of potential message recipients.

16. The method of claim 15, further comprising assigning corresponding lead scores to each of the plurality of potential message recipients.

17. The method of claim 16, further comprising selecting the message recipient based on a lead score associated with the message recipient.

18. A system, comprising:
a processor configured to:
receive a specification of a logic flow for automatically interacting with a message recipient, wherein the logic flow specifies a dynamic interaction between a plurality of different communication channels for the message recipient, wherein the logic flow includes a plurality of blocks, wherein a first block of the plurality of blocks corresponds to a first message, wherein a second block of the plurality of blocks corresponds to a second message, wherein the first block is linked to the second block; and
deploy the logic flow, wherein to deploy the logic flow, the processor is configured to:
automatically send the first message to the message recipient via a first communication channel, wherein the first message is associated with a first conversation;
receive an indication provided in response to a plurality of response options provided in the first message; and
in response to the received indication, automatically send the second message via a second communication channel that is different from the first communication channel, wherein the second message includes content that resumes the first conversation with the message recipient via the first communication channel.

19. A computer program product embodied in a non-transitory computer readable medium and comprising computer instructions for:
receiving a specification of a logic flow for automatically interacting with a message recipient, wherein the logic flow specifies a dynamic interaction between a plurality of different communication channels for the message recipient, wherein the logic flow includes a plurality of blocks, wherein a first block of the plurality of blocks corresponds to a first message, wherein a second block of the plurality of blocks corresponds to a second message, wherein the first block is linked to the second block; and
deploying the logic flow including by:
automatically sending the first message to the message recipient via a first communication channel, wherein the first message is associated with a first conversation;
receiving an indication provided in response to a plurality of response options provided in the first message; and
in response to the received indication, automatically sending the second message via a second communication channel that is different from the first communication channel, wherein the second message includes content that resumes the first conversation with the message recipient via the first communication channel.

* * * * *